US 12,191,103 B2

(12) United States Patent
Schmitt et al.

(10) Patent No.: US 12,191,103 B2
(45) Date of Patent: Jan. 7, 2025

(54) SAFETY DEVICE

(71) Applicant: Euchner GmbH + Co. KG, Leinfelden-Echterdingen (DE)

(72) Inventors: Benedikt Schmitt, Leinfelden-Echterdingen (DE); Anne Fieg, Stuttgart (DE); Jens Rothenburg, Nürtingen (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 0 days.

(21) Appl. No.: 17/306,974

(22) Filed: May 4, 2021

(65) Prior Publication Data

US 2021/0398755 A1  Dec. 23, 2021

(30) Foreign Application Priority Data

Jun. 18, 2020  (EP) .................................. 20180684

(51) Int. Cl.
| | | |
|---|---|---|
| *H01H 9/20* | (2006.01) | |
| *F16P 3/08* | (2006.01) | |
| *G05B 15/02* | (2006.01) | |
| *G06K 7/10* | (2006.01) | |

(52) U.S. Cl.
CPC .............. *H01H 9/20* (2013.01); *G05B 15/02* (2013.01); *G06K 7/10366* (2013.01)

(58) Field of Classification Search
CPC ...... H01H 9/20; G05B 15/02; G06K 7/10366; H04B 5/0062; F16P 3/08
USPC ......................................................... 307/143
See application file for complete search history.

(56) References Cited

U.S. PATENT DOCUMENTS

| | | | |
|---|---|---|---|
| 2003/0058602 A1* | 3/2003 | Veil ....................... | H01H 47/005 361/166 |
| 2010/0261453 A1* | 10/2010 | Menzel ............... | H04L 63/0492 340/572.1 |
| 2014/0288687 A1* | 9/2014 | Mailander ................ | G05B 9/02 700/97 |
| 2016/0104014 A1 | 4/2016 | Phay | |
| 2018/0292045 A1* | 10/2018 | Mailänder ............. | H01H 9/285 |
| 2021/0230904 A1* | 7/2021 | Pizzato .................... | F16P 3/08 |

FOREIGN PATENT DOCUMENTS

WO          2009089208 A1    7/2009

\* cited by examiner

*Primary Examiner* — Rexford N Barnie
*Assistant Examiner* — Xuan Ly
(74) *Attorney, Agent, or Firm* — Michael Soderman

(57) ABSTRACT

A safety device (8) with a safety switch (7) and at least one actuator (9), wherein when an actuator (9) is arranged within a response range relative to the safety switch (7), signals are transmitted from the actuator (9) to the safety switch (7), by which means a function of the safety switch (7) is released. The actuator (9) is additionally designed for configuring the safety switch in that a configuration signal is transmissible from the actuator (9) to the safety switch (7).

13 Claims, 2 Drawing Sheets

SAFETY DEVICE

CROSS REFERENCE TO RELATED APPLICATIONS

This application claims the priority of EP 20180684.1 filed on 2020 Jun. 18; this application is incorporated by reference herein in its entirety.

BACKGROUND

The invention concerns a safety device.

Such safety devices comprise a safety switch and at least one actuator arranged movably relative to the safety switch. The safety device thusly embodied is generally used in the area of safety technology. An example of such a use in the area of safety technology is an access security system for a hazard area wherein the access can be barred by means of a safety door. In this case, the actuator is typically arranged on the safety door, while the safety switch is arranged on a frame structure delimiting the access. The term 'safety door' includes doors, flaps, hoods, caps, pivoting and sliding doors, as well as similar devices.

Known safety switches have an RFID system with a transponder integrated in the actuator and a reading unit integrated in the safety switch. By means of this RFID system, the closed position of the safety door can be controlled. Only when the door is in the closed position is the transponder in the actuator spatially assigned to the reading unit in the safety switch such that transponder signals of the transponder are received by the reading unit.

In addition, the safety door can be secured in its closed position by means of the safety device. For this purpose, the safety switch typically has a guard locking element in the form of a guard locking bolt which, when the safety door is in the closed position, can be moved into a receptacle, in particular a recess in the actuator, thus effecting guard locking of the safety door.

The safety switch generates a release signal for operating a system in the hazard area only if in an effected guard locked state, the closed position of the actuator is detected by receiving the signals of the transponder in the reading unit, otherwise a switch-off command for the system will be generated in the safety switch.

The system is generally released via safety outputs of the safety switch that are switched on for this purpose.

In such safety devices, in order to perform an adjustment to the respective application, different functions, especially including safety-related functions, can be preset by a configuration of the safety switch.

To this end, aside from the actuators with which the functions of the safety switch are released, configuration actuators can be implemented that serve only for configuring the safety switch.

It is disadvantageous in this regard that significant added effort results due to the configuration actuators, as additional units of the safety device, especially with regard to the production, warehousing and additional logistical effort. This includes, on the one hand, the production and storage of the various safety devices and on the other hand, the differentiation, support and prevention of mix-ups.

A configuration of the safety switches with a configuration actuator is not verifiable since the configuration is not evident on the safety switch, which carries the risk of manipulation or malfunction, especially when replacing safety switches.

Furthermore, configuring safety switches by means of DIP switches is known. In this regard it is disadvantageous that in order to actuate the DIP switch, the safety switch has to be opened, which is not only cumbersome but also necessitates higher manufacturing costs and special sealing measures. This is because without opening the switch, or providing an opening or a sight window, these settings are not evident from the outside, especially when replacing the configured safety switch.

SUMMARY

The invention seeks to solve the problem of providing a safety device of the initially stated type with which increased functional safety is achieved.

The features of claim 1 are provided to solve this problem. Advantageous embodiments and useful further embodiments are described in the dependent claims.

DETAILED DESCRIPTION

The invention relates to a safety device with a safety switch and at least one actuator, wherein signals are transmitted to the safety switch by actuators arranged within a response range of the safety switch, by which means a function of the safety switch is released. The actuator is additionally designed for configuring the safety switch in that a configuration signal is transmissible from the actuator to the safety switch.

The basic idea of the invention therefore consists in equipping the at least one actuator of the safety device with a double function. Aside from the known function of releasing a function of the safety switch, a configuration of the safety switch can also be performed with the actuator.

No additional units, such as separate configuration actuators, are therefore required for configuring the safety switch. Moreover, it is not necessary for any additional design features, such as DIP switches, openings, sight windows, configuration inputs, serial interfaces or similar, to be provided on the safety switch.

The functioning of the safety device is preferably such that the safety switch and the actuator have data transmission means by means of which data can be wirelessly transmitted between the safety switch and the actuator arranged within the response range of the safety switch.

Radio signals, in particular, but also magnetic or optical signals and similar, in principle, are suitable for data transmission.

The data can be stored in the safety switch.

It is especially advantageous for the actuator to have a transponder and for the safety switch to have an RFID reading unit.

Data stored in the transponder can be read with the RFID reading unit once the transponder is located within the response range of the RFID reading unit.

The data stored in the transponder is present in the form of a data code, such as a bit sequence, for example, that can be transmitted to the RFID reading unit. The data code contains general identification data as well as data about the functions and configurations that can be released on the safety switch.

According to the invention, a defined characteristic of the data code, such as bits of the bit sequence or hash values, constitutes a configuration signal with which, when the data code is read into the safety switch, a certain configuration of the safety switch can be determined and declared.

In this regard, the actuator is advantageously designed with a data code such that through the data code, a precise configuration of the safety switch is set. Through this uniqueness, improper configurations of the safety switch are reliably prevented, including under fault conditions. In particular, a configuration can also comprise multiple functions of a safety switch.

In the simplest case, one bit of the bit sequence constitutes the configuration signal.

In general, it can also be necessary or expedient for multiple bits to constitute a configuration signal and in this way, define a configuration.

According to an advantageous embodiment of the invention, multiple actuators are assigned to the safety switch.

Advantageously, actuators in which different configuration signals are stored for setting various configurations are assigned to the safety switch.

The safety switch can therefore be configured into a desired configuration through a suitable selection of an actuator. This represents a very straightforward option for configuring the safety switch in different ways.

It is possible that when the safety switch is configured with an actuator, the respective configuration is stored in the safety switch. This can help to prevent malfunctions and manipulations of the safety switch.

It is especially advantageous, following a configuration of the safety switch with a first actuator, for all other actuators with configurations differing from this to be rendered inoperative.

For some applications, it can be expedient for multiple actuators to be available in order to release a function of the safety switch in working operation. This can be useful in order to reliably detect different positions of a roll-up gate, turntable or similar mobile objects. To do so, a safety switch is respectively arranged at each position that is to be detected.

In this case, it is expedient for multiple identical actuators to be assigned to the safety switch.

These multiple actuators have the same configuration signal and therefore effect the same configuration. If the safety switch was configured with this configuration, all of these actuators can then be used to release the respective function in working operation.

Especially advantageously, the configuration of the safety switch occurs in a configuration mode that is separate from a working operation of the safety switch, in which a releasing of a function is performed with the at least one actuator once the actuator is located within the response range of the safety switch.

Advantageously, when powered up, i.e. upon being switched on, and/or upon being commissioned, the safety switch autonomously switches to the configuration mode. In this case, the safety switch preferably switches to the configuration mode for a preset time. The user can use this time interval to configure the safety switch with an actuator.

Advantageously, a configuring, especially a reconfiguring of the safety switch, can occur by performing a factory reset of the safety switch, which can advantageously be followed by a learning procedure for learning the data codes of the respective actuator, although this is not compulsory.

If during commissioning, for example, the safety switch is configured with a first actuator with a corresponding first configuration and if subsequently this is to be changed during working operation of the safety switch, the working operation can be interrupted by the factory reset and the safety switch switches to the configuration mode, in which the safety switch can be reconfigured with another actuator.

According to an advantageous embodiment, the safety switch has an arrangement of safety outputs, whereby the releasing of a function of the safety switch consists of a switching on of the safety outputs.

For example, operation of a hazardous system can be released by the switching on of the safety outputs.

The safety device can then be used for securing access to a hazard area at this system. Typically access to the hazard area is via at least one safety door, or respectively a flap, hood, cover, pivoting or sliding door or similar device that is monitored using the safety device.

According to a first embodiment, the safety device has a safety switch with latching, i.e. the safety switch is used to monitor whether the safety door is in its closed position. Only if this is the case operation of the system is released by switching on the safety outputs of the safety switch.

According to a second embodiment, the safety device has a safety switch with guard locking. In this case, operation of the system is released via the safety outputs of the safety switch only if a guard locking element of the safety switch is used to effect the guard locking of the safety door in its closed position.

Accordingly, actuators with different configuration signals depending on whether a safety switch with latching or guard locking is provided for can be used to configure different functions of the latching or guard locking.

For example, different latching positions can be configured for a safety switch with latching.

For a safety switch with guard locking, for example, the functions "protection of persons" and "protection of process" can be configured, wherein in the first case, a switching on of the safety outputs of the safety switch, and therefore a release of operation of the system, only occurs if the guard locking is active for the safety door in its closed position. Conversely, in the second case, the switching on of the safety outputs occurs as soon as the safety door is closed.

BRIEF DESCRIPTION OF THE DRAWINGS

The invention is explained below based on the drawings. They show.

DETAILED DESCRIPTION OF THE PREFERRED EMBODIMENTS

Figure 1:
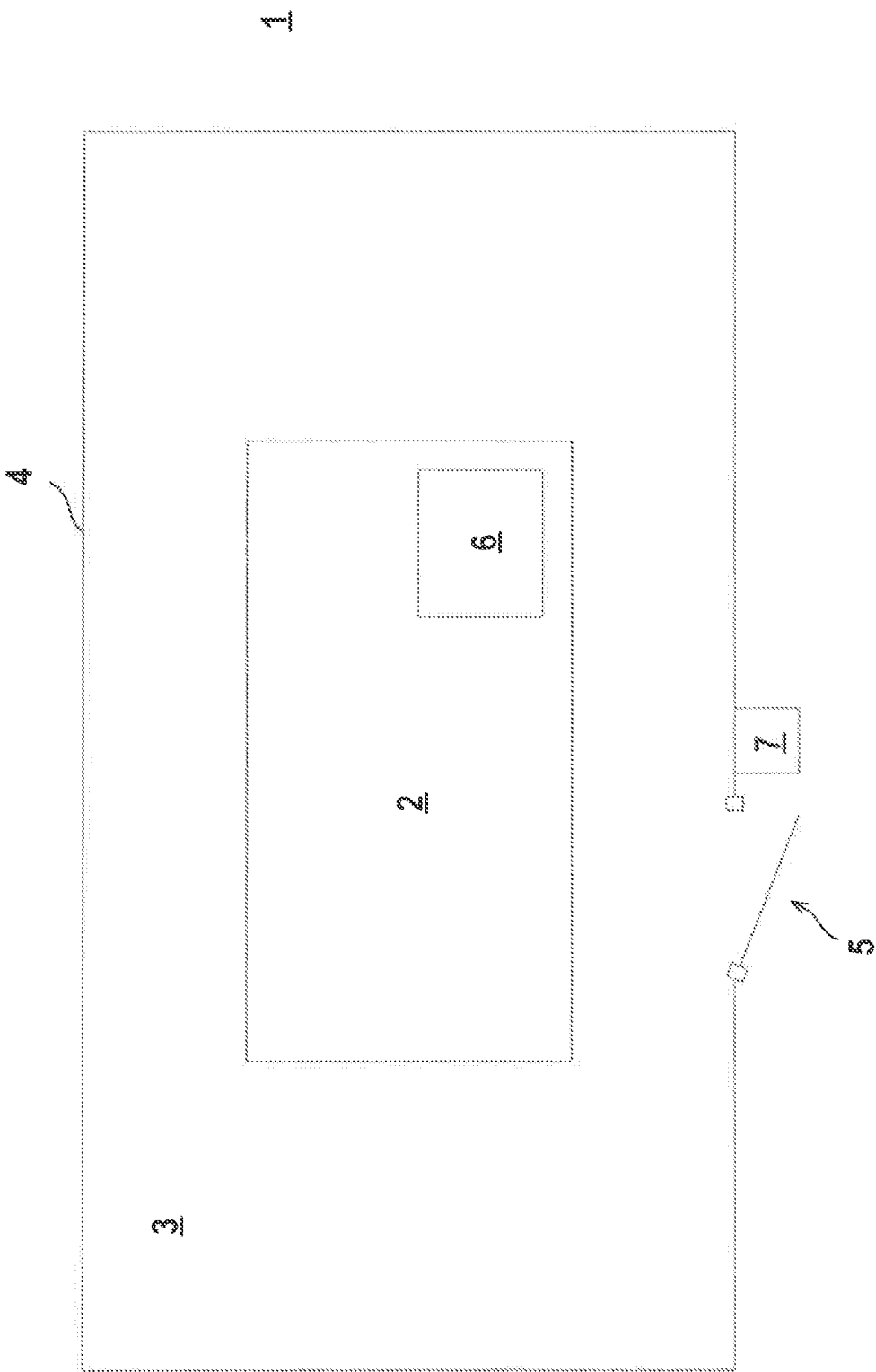
FIG. 1: Schematic depiction of a safety device for securing a hazard area.

FIG. 1 shows a schematic depiction of a safety system 1 for safe operation of a system 2. The system 2 can present hazards, especially for persons. Accordingly a hazard area 3 around the system 2 is secured with a surrounding fence 4. A safety door 5 is provided in the surrounding fence through which safety door 5 persons can gain access to the hazard area 3.

The safety system 1 comprises a safety controller 6 that controls the operation of the system 2. Furthermore, a safety switch 7 is provided that is used to monitor whether the safety door 5 is closed or guard locked, or not. The safety controller 6 controls the operation of the system 2 dependent on the signals generated by the safety switch 7.

To this end, the safety switch 7 has an arrangement of safety outputs via which the signals are output to the safety controller 6. The safety switch 7 generates signals such that the operation of the system 2 is only released when the safety door 5 is closed in its closed position (protection of process) or closed and guard locked (protection of persons).

Figure 2:
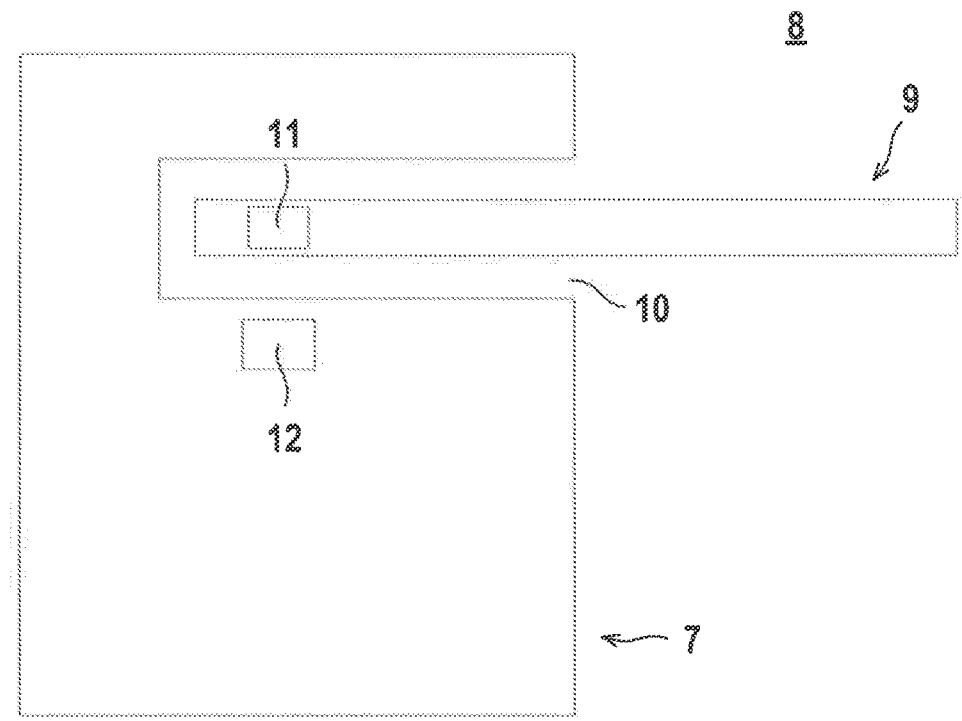
FIG. 2: Schematic depiction of a safety device with a safety switch with latching and an assigned actuator.
Figure 3:
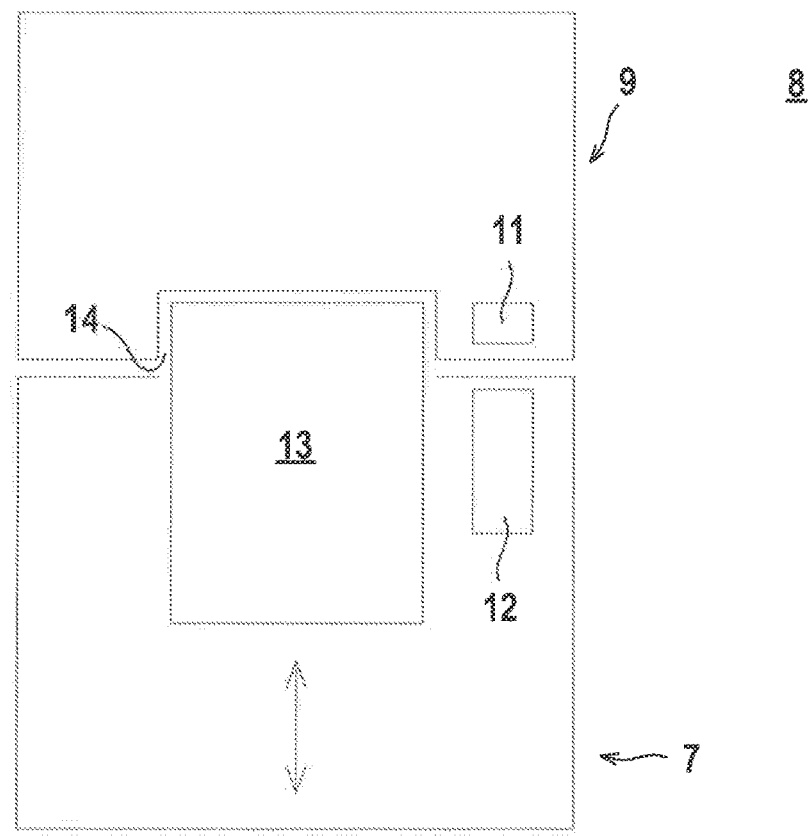
FIG. 3: Schematic depiction of a safety device with a safety switch with guard locking and an assigned actuator.

The safety device 8 according to the invention is intended especially for safety systems 1 as depicted in FIG. 1, wherein FIGS. 2 and 3 show examples of this safety device 8.

FIG. 2 shows a schematic depiction of a safety device 8 with a safety switch 7 with latching, to which one or preferably multiple actuators 9 of identical construction are assigned. For simplicity, only one such actuator 9 is shown in FIG. 2.

The safety device 8 is used, for example, to monitor the closed position of a safety door 5 as shown in FIG. 1, wherein the actuator 9 can be arranged on the safety door 5 for this purpose.

The closed position is achieved when the actuator 9 has entered the response range of the safety switch 7, wherein in the embodiment from FIG. 2, this is the case when the actuator 9 has entered into a recess 10 of the safety switch 7.

Then a transponder 11 inside the actuator 9 is located in the response range of an RFID reading unit 12 of the safety switch 7, such that data stored by the RFID reading unit 12 in the transponder 11 is read and processed in the safety switch 7, preferably in a memory unit of a computer unit.

In working operation of the safety switch 7, when the closed position of the safety door 5 is detected in this manner, the safety outputs of the system 2 are switched on, thereby releasing the operation of the system 2.

FIG. 3 shows an additional embodiment of the safety device 8, which again comprises a safety switch 7 and preferably multiple actuators 9 of identical construction, of which only one is shown.

With the safety device 8 shown in FIG. 3, a guard locking of a safety door 5 in its closed position is effected and monitored.

FIG. 3 shows the position of the actuator 9 on the safety door 5 when it is in its closed position. Then the transponder 11 of the actuator 9 is again located within the response range of the RFID reading unit 12 of the safety switch 7, such that with the RFID reading unit 12, data can be read from the transponder 11. Again, the data is stored in the safety switch 7.

Additionally, the safety switch 7 has a guard locking element 13 that is displaceable between a closed and open position and can be formed by a displaceable guard locking bolt. The displacement of the guard locking bolt can be accomplished by means of an electromagnet, for example. FIG. 3 shows the guard locking bolt in the closed position, in which the guard locking element 13 is inserted into a recess 14 of the actuator 9, which effects the guard locking of the safety door 5.

The data is stored in the form of a data code in each actuator 9 of the safety device 8 from FIGS. 2 and 3, i.e. in its transponder 11. In this regard, identification data and data regarding the functions of the actuator 9 are stored in the characteristics of the data code. According to the invention, for each actuator 9, a configuration signal is encoded in the characteristics of the data code, which signal defines a configuration of the safety switch 7. In the simplest case, only one bit is provided for this. In general, multiple bits can also be provided for this. The characteristics of a data code can also be constituted by hash values and similar.

In the present case, multiple actuators 9 are assigned to the safety switch 7 for every safety device 8 from FIGS. 2 and 3. Different configuration signals for setting different configurations are stored in the transponders 11 of the individual actuators 9. In principle, multiple actuators 9 can also be provided with respectively identical configuration signals.

During working operation of the safety switch 7, it is advantageous for an actuator 9 to be only used for releasing a function, such as a switching on of the safety outputs when the transponder 11 of the actuator 9 is located in the response range of the RFID reading unit 12. Conversely, in a configuration mode, an actuator 9 is used to set a configuration of the safety switch 7.

In general, it is also possible to set a configuration during the working operation of the safety switch 7.

Upon commissioning of a safety switch 7 or after powering up (switching on) the safety switch 7, it is advantageous for it to enter the configuration mode for a preset time interval, such that the safety switch 7 can be configured with an actuator 9. Furthermore, the safety switch 7 can be switched to the configuration mode by a factory reset. Such a factory reset can be used, in particular, for a reconfiguration with an additional actuator 9.

It is especially advantageous for the configuration in the configuration mode to occur such that when an actuator 9 with its transponder 11 is brought into the response range of the RFID reading unit of the safety switch 7, the configuration signals of this actuator 9 are read into the safety switch 7 and stored there. The safety switch 7 then adopts the configuration corresponding to the configuration signals for the subsequent working operation. All other actuators 9 with other configuration signals are then automatically rendered inoperative.

The configuration of the safety switch 7 remains intact until it is reconfigured. This reconfiguration is advantageously initiated by a factory reset.

In the safety switch 7 with latching from FIG. 2, for example, a position detection of different door positions of the safety door 5 is possible, wherein such positions can be set by way of a configuration.

In the safety switch 7 with guard locking from FIG. 3, for example, the functions "protection of persons" and "protection of process" can be configured, wherein in the first case, the safety outputs of the safety switch 7 are switched on, thereby releasing operation of the system 2 only when the safety door 5 is in its closed position and the guard locking is active. Conversely, in the second case, the safety outputs are switched on already once the safety door 5 is closed.

LIST OF REFERENCE NUMERALS (1) Safety system
(2) System
(3) Hazard area
(4) Surrounding fence
(5) Safety door
(6) Safety controller
(7) Safety switch
(8) Safety device
(9) Actuator
(10) Recess
(11) Transponder
(12) RFID reading unit
(13) Guard locking element
(14) Recess

The invention claimed is:

1. A safety device with a safety switch and at least one actuator, said actuator only comprised of a transponder, said transponder serving as a sole data transmission device, and said actuator fulfilling a double function of releasing and configuring the safety switch, wherein when the actuator is arranged within a response range relative to the safety switch, signals are transmitted from the actuator to the safety switch, by which means a function of the safety switch is released, characterized in that the actuator is additionally designed for configuring the safety switch in that a configuration signal is transmissible from the actuator to the safety switch, wherein a configuration signal is encoded in data code of the actuator in addition to identification data, and wherein different functions can be preset by a configuration of the safety switch, wherein following a configuration of the safety switch with a first actuator all other actuators with configurations differing from this are rendered invalid such that configuration signals of all other actuators are then automatically rendered inoperative, wherein for a safety switch with latching, different latching positions can be configured or wherein for a safety switch with guard locking, the functions of protection of persons and of protection of process can be configured, wherein in the configuration of protection of persons the safety outputs of the safety switch, and therefore a release of operation of the system, only occurs if the guard locking is active for the safety door in its closed position, and in the configuration of protection in process the switching on of the safety outputs occurs as soon as the safety door is closed.

2. The safety device according to claim 1, characterized in that the safety switch and the actuator have data transmission means by means of which, when the actuator is arranged within the response range of the safety switch, data can be wirelessly transmitted between them.

3. The safety device according to claim 1, characterized in that the safety switch has an RFID reading unit.

4. The safety device according to claim 1, characterized in that a data code is transmitted from the actuator to the safety switch, wherein a preset characteristic of the data code constitutes the configuration signal.

5. The safety device according to claim 1, characterized in that multiple actuators are assigned to the safety switch.

6. The safety device according to claim 5, characterized in that multiple identical actuators are assigned to the safety switch.

7. The safety device according to claim 5, characterized in that actuators are assigned to the safety switch in which actuators different configuration signals for setting various configurations are stored.

8. The safety device according to claim 1, characterized in that, during a working operation of the safety switch, with an actuator it is only possible to release functions.

9. The safety device according to claim 1, characterized in that in a configuration mode of the safety switch, it can be configured by means of an actuator.

10. The safety device according to claim 9, characterized in that after a factory reset, during a commissioning or after a switching-on operation, the safety switch enters the configuration mode.

11. The safety device according to claim 10, characterized in that the safety switch enters the configuration mode for a preset time interval.

12. The safety device according to claim 1, characterized in that the safety switch has an arrangement of safety outputs, wherein the releasing of a function of the safety switch consists of a switching-on of safety outputs.

13. The safety device according to claim 1, characterized in that a safety switch with latching or guard locking is provided and that different functions of the latching or guard locking are configurable.

* * * * *